US010374224B2

(12) United States Patent
Torita et al.

(10) Patent No.: US 10,374,224 B2
(45) Date of Patent: Aug. 6, 2019

(54) METHOD OF MANUFACTURING NON-AQUEOUS ELECTROLYTE SOLUTION SECONDARY BATTERY AND NON-AQUEOUS ELECTROLYTE SOLUTION SECONDARY BATTERY

(71) Applicant: TOYOTA JIDOSHA KABUSHIKI KAISHA, Toyota-shi, Aichi-ken (JP)

(72) Inventors: Koji Torita, Nagoya (JP); Tatsuya Hashimoto, Osaka (JP); Keiichi Takahashi, Nishinomiya (JP); Akihiro Taniguchi, Ashiya (JP); Shuji Tsutsumi, Ikoma (JP); Yusuke Fukumoto, Toyonaka (JP); Yuji Yokoyama, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 135 days.

(21) Appl. No.: 15/676,416

(22) Filed: Aug. 14, 2017

(65) Prior Publication Data

US 2018/0076450 A1 Mar. 15, 2018

(30) Foreign Application Priority Data

Sep. 13, 2016 (JP) ................................ 2016-178432

(51) Int. Cl.

*H01M 4/36* (2006.01)
*H01M 4/131* (2010.01)
*H01M 4/505* (2010.01)
*H01M 4/525* (2010.01)

(Continued)

(52) U.S. Cl.

CPC ........... *H01M 4/364* (2013.01); *H01M 4/131* (2013.01); *H01M 4/1391* (2013.01);

(Continued)

(58) Field of Classification Search

CPC .... C01G 45/1228; C01G 51/50; C01G 53/50; H01M 4/364; H01M 4/505; H01M 4/525;

(Continued)

(56) References Cited

U.S. PATENT DOCUMENTS

2007/0059302 A1* 3/2007 Baca ...................... C07K 16/22 424/133.1
2014/0113193 A1* 4/2014 Tsunozaki ............ H01M 4/364 429/220

(Continued)

FOREIGN PATENT DOCUMENTS

JP 2006-332020 A 12/2006
JP 2007-265668 A 10/2007

(Continued)

OTHER PUBLICATIONS

Guoping et al "The effect of different kinds of nano-carbon conductive additives in lithium ion batteries on the resistance and electrochemical behavior of the LiCoO2 composite cathodes". Solid State Ionics 179 (2008) p. 263-268.*

(Continued)

*Primary Examiner* — Stephen J Yanchuk
(74) *Attorney, Agent, or Firm* — Sughrue Mion, PLLC

(57) ABSTRACT

A method of manufacturing a non-aqueous electrolyte solution secondary battery includes: (A) preparing a first composite material by mixing a first positive electrode active material, a first conductive material and a first binder; (B) preparing a second composite material by mixing a second positive electrode active material, a second conductive material and a second binder; and (C) manufacturing a positive electrode by forming a positive electrode composite layer including the first composite material and the second composite material. The first positive electrode active material has an average discharge potential lower than that of the second positive electrode active material. The first conduc- (Continued)

tive material has a first OAN. The second conductive material has a second OAN. A ratio of the second OAN to the first OAN is 1.3 or more and 2.1 or less. A sum of the first OAN and the second OAN is 31.64 ml/100 g or less.

4 Claims, 4 Drawing Sheets

(51) Int. Cl.

| | |
|---|---|
| ***H01M 10/0525*** | (2010.01) |
| ***H01M 4/1391*** | (2010.01) |
| ***H01M 10/052*** | (2010.01) |
| *C01G 45/12* | (2006.01) |
| *C01G 51/00* | (2006.01) |
| *C01G 53/00* | (2006.01) |
| *H01M 4/02* | (2006.01) |

(52) U.S. Cl.
CPC .......... *H01M 4/505* (2013.01); *H01M 4/525* (2013.01); *H01M 10/052* (2013.01); *H01M 10/0525* (2013.01); *C01G 45/1228* (2013.01); *C01G 51/50* (2013.01); *C01G 53/50* (2013.01); *H01M 2004/021* (2013.01); *H01M 2004/028* (2013.01); *Y02T 10/7011* (2013.01)

(58) Field of Classification Search
CPC .............. H01M 4/131; H01M 4/1391; H01M 2004/028; H01M 2004/021; Y02T 10/7011
See application file for complete search history.

(56) References Cited

U.S. PATENT DOCUMENTS

| | | | | |
|---|---|---|---|---|
| 2014/0170484 | A1* | 6/2014 | Fukahori | H01M 4/13 429/211 |
| 2015/0349329 | A1 | 12/2015 | Saka et al. | |
| 2016/0118646 | A1* | 4/2016 | Ikenuma | H01M 4/0416 427/122 |
| 2016/0248085 | A1 | 8/2016 | Umeyama et al. | |

FOREIGN PATENT DOCUMENTS

| | | | |
|---|---|---|---|
| JP | 2007-531216 | A | 11/2007 |
| JP | 2008-293988 | A | 12/2008 |
| JP | 2010-67365 | A | 3/2010 |
| JP | 2012-243463 | A | 12/2012 |
| JP | 2015-153535 | A | 8/2015 |
| JP | 2015-228282 | A | 12/2015 |
| JP | 2016-058309 | A | 4/2016 |
| JP | 2016-154100 | A | 8/2016 |
| WO | 2006/004279 | A1 | 1/2006 |
| WO | 2016/038440 | A1 | 3/2016 |

OTHER PUBLICATIONS

Zheng et al "Cooperation between active Material, Polymeric Binder and Conductive Carbon Additive in Lithium Ion Battery Cathode". J. Phys. Chem. C 2012, 116, 4875-4882.*

* cited by examiner

METHOD OF MANUFACTURING NON-AQUEOUS ELECTROLYTE SOLUTION SECONDARY BATTERY AND NON-AQUEOUS ELECTROLYTE SOLUTION SECONDARY BATTERY

This nonprovisional application is based on Japanese Patent Application No. 2016-178432 filed on Sep. 13, 2016, with the Japan Patent Office, the entire contents of which are hereby incorporated by reference.

BACKGROUND

Field

The present disclosure relates to a method of manufacturing a non-aqueous electrolyte solution secondary battery, and the non-aqueous electrolyte solution secondary battery.

Description of the Background Art

Japanese Patent Laying-Open No. 2007-265668 discloses a positive electrode including two positive electrode active materials having different average discharge potentials.

SUMMARY

It is considered that reactivity of a positive electrode active material with a charge carrier is high around its average discharge potential. In other words, it is considered that the positive electrode active material provides a high output around the average discharge potential. By mixing two types of positive electrode active materials having different average discharge potentials, it is expected to expand a potential range in which a high output is obtained. In a non-aqueous electrolyte solution secondary battery, the expansion of the potential range in which the high output is obtained means expansion of an SOC (State Of Charge) range in which the high output is obtained.

Here, the “SOC” represents a ratio of a present charge capacity to a full charge capacity of a battery. In the present specification, an SOC of about 20% is represented as “low SOC”, and an SOC of about 50% is represented as “intermediate SOC”.

A non-aqueous electrolyte solution secondary battery including two types of positive electrode active materials having different average discharge potentials has room for improvement in cycle durability. Specifically, after a charging/discharging cycle, a decrease in output at the low SOC is more notable than a decrease in output at the intermediate SOC.

Therefore, the present disclosure has an object to provide a non-aqueous electrolyte solution secondary battery attaining a high output in a wide SOC range and excellent in cycle durability.

Hereinafter, the technical configuration and function and effect of the present disclosure will be described. However, the mechanism of the function of the present disclosure includes presumption and the scope of claims should not be limited depending on whether the presumption is correct or incorrect.

[1] A method of manufacturing a non-aqueous electrolyte solution secondary battery in the present disclosure includes the following (A) to (D).

(A) A first composite material is prepared by mixing a first positive electrode active material, a first conductive material and a first binder.

(B) A second composite material is prepared by mixing a second positive electrode active material, a second conductive material and a second binder.

(C) A positive electrode is manufactured by forming a positive electrode composite layer including the first composite material and the second composite material.

(D) The non-aqueous electrolyte solution secondary battery is manufactured which includes the positive electrode, a negative electrode, and a non-aqueous electrolyte solution.

In the method of manufacturing the non-aqueous electrolyte solution secondary battery in the present disclosure, the positive electrode composite layer is formed to satisfy the following conditions.

The first positive electrode active material has an average discharge potential lower than an average discharge potential of the second positive electrode active material. The first positive electrode active material has a mass ratio of 10 mass % or more and 50 mass % or less with respect to a total of the first positive electrode active material and the second positive electrode active material.

The first conductive material has a first oil absorption number with respect to 100 parts by mass of the first positive electrode active material. The second conductive material has a second oil absorption number with respect to 100 parts by mass of the second positive electrode active material. A ratio of the second oil absorption number to the first oil absorption number is 1.3 or more and 2.1 or less. A sum of the first oil absorption number and the second oil absorption number is 31.64 ml/100 g or less.

In such a non-aqueous electrolyte solution secondary battery including the two types of positive electrode active materials having different average discharge potentials, the positive electrode active material having the relatively low average discharge potential is responsible for the output at the low SOC.

When both the two types of positive electrode active materials having the different average discharge potentials are in the positive electrode composite layer, the positive electrode active material having the relatively low average discharge potential reacts preferentially during charging/discharging. In other words, a load on the positive electrode active material having the relatively low average discharge potential is larger than that on the positive electrode active material having the relatively high average discharge potential. This accelerates cycle deterioration of the positive electrode active material having the relatively low average discharge potential. This presumably results in a large decrease in output at the low SOC.

In the method of manufacturing the non-aqueous electrolyte solution secondary battery in the present disclosure, the first positive electrode active material corresponds to the positive electrode active material having the relatively low average discharge potential, and the second positive electrode active material corresponds to the positive electrode active material having the relatively high average discharge potential. In the description below, the first positive electrode active material and the second positive electrode active material may be collectively referred to as “positive electrode active material”. The first conductive material and the second conductive material may be collectively referred to as “conductive material”. The first binder and the second binder may be collectively referred to as “binder”. The first composite material and the second composite material may be collectively referred to as “composite material”.

As indicated in (A) and (B) above, first, the first composite material and the second composite material are prepared separately by mixing the respective positive electrode active materials, the respective conductive materials, and the respective binders. The term “composite material” in the present disclosure indicates a mixture prepared by mixing at least the following three components: the positive electrode active material, the conductive material, and the binder. During the mixing, the binder binds the positive electrode active material to the conductive material. That is, the conductive material is adhered onto a surface of the positive electrode active material.

Next, as indicated in (C) above, the positive electrode composite layer including the first composite material and the second composite material is formed. Accordingly, the positive electrode is manufactured. In the positive electrode composite layer, it is considered that a state in which the first conductive material is adhered to the first positive electrode active material and a state in which the second conductive material is adhered to the second positive electrode active material are maintained.

In the method of manufacturing the non-aqueous electrolyte solution secondary battery in the present disclosure, a balance between reactivity of the first positive electrode active material and reactivity of the second positive electrode active material is maintained in accordance with the oil absorption number of the conductive material. The "oil absorption number" is an index indicating an amount of oil that can be absorbed by a material. The non-aqueous electrolyte solution may be considered as one type of oil. As the oil absorption number is larger, the conductive material can absorb and hold a larger amount of the non-aqueous electrolyte solution.

The first conductive material has the first oil absorption number. The second conductive material has the second oil absorption number.

The first oil absorption number is a value with respect to 100 parts by mass of the first positive electrode active material. The first oil absorption number is determined as a product of a unit oil absorption number and a blending amount of the first conductive material with respect to 100 parts by mass of the first positive electrode active material. The "unit oil absorption number" indicates an oil absorption number per 100 g of a material [ml/100 g]. The second oil absorption number can be found in the same manner as the first oil absorption number.

On the first positive electrode active material, the first conductive material having the first oil absorption number is adhered. On the second positive electrode active material, the second conductive material having the second oil absorption number is adhered. The second oil absorption number is larger than the first oil absorption number. Accordingly, the amount of the non-aqueous electrolyte solution is relatively small around the first positive electrode active material reacting more preferentially in accordance with the potential (the positive electrode active material having the relatively low average discharge potential), whereas the amount of the non-aqueous electrolyte solution is relatively large around the second positive electrode active material reacting less preferentially in accordance with the potential (the positive electrode active material having the relatively high average discharge potential).

Hence, a reaction between the first positive electrode active material and the non-aqueous electrolyte solution is suppressed while accelerating a reaction between the second positive electrode active material and the non-aqueous electrolyte solution. Accordingly, a balance between the reactivity of the first positive electrode active material and the reactivity of the second positive electrode active material is maintained. In other words, during the charging/discharging cycle, both the first positive electrode active material and the second positive electrode active material are used in good balance. As a result, the high output can be maintained in a wide SOC range after the charging/discharging cycle.

However, the ratio (hereinafter, also referred to as "oil absorption number ratio") of the second oil absorption number to the first oil absorption number needs to be 1.3 or more and 2.1 or less. The oil absorption number ratio is calculated by dividing the second oil absorption number by the first oil absorption number. When the oil absorption number ratio is less than 1.3, the first positive electrode active material preferentially reacts, thus resulting in a large decrease in output at the low SOC after the charging/discharging cycle. When the oil absorption number ratio is more than 2.1, the second positive electrode active material preferentially reacts, thus resulting in a large decrease in output at the intermediate SOC after the charging/discharging cycle.

The sum (hereinafter, also referred to as "oil absorption number sum") of the first oil absorption number and the second oil absorption number needs to be 31.64 ml/100 g or less. When the oil absorption number sum is more than 31.64 ml/100 g, the conductive material becomes excessive with respect to the positive electrode active material. Accordingly, the capacity maintenance ratio after the charging/discharging cycle may be decreased.

Further, the first positive electrode active material needs to have a mass ratio of 10 mass % or more and 50 mass % or less with respect to the total of the first positive electrode active material and the second positive electrode active material. When the mass ratio of the first positive electrode active material is less than 10 mass %, the output at the low SOC may be insufficient from an initial stage. When the mass ratio of the first positive electrode active material is more than 50 mass %, the output at the intermediate SOC may be insufficient from the initial stage.

Finally as indicated in (D) above, the non-aqueous electrolyte solution secondary battery including the positive electrode, the negative electrode, and the non-aqueous electrolyte solution is manufactured. This non-aqueous electrolyte solution secondary battery attains a high output in a wide SOC range (both the low SOC and the intermediate SOC) and is excellent in cycle durability.

[2] In the manufacturing method according to [1], the positive electrode composite layer may be formed such that the sum of the first oil absorption number and the second oil absorption number is 15.36 ml/100 g or more.

When the oil absorption number sum is small, the absolute amount of the non-aqueous electrolyte solution in the positive electrode composite layer is decreased, with the result that the effect of improving the cycle durability becomes presumably small. The lower limit value of the oil absorption number sum may be 15.36 ml/100 g, for example.

[3] In the manufacturing method according to [1] or [2], the first positive electrode active material may have a first composition represented by $LiNi_{a1}Co_{b1}Mn_{c1}O_2$ (formula (I)) where $0.3<a1<0.5$, $0.4<b1<0.6$, $0<c1<0.2$, and $a1+b1+c1=1$, and the second positive electrode active material may have a second composition represented by $LiNi_{a2}Co_{b2}Mn_{c2}O_2$ (formula (II)) where $0.3<a2<0.5$, $0.1<b2<0.3$, $0.3<c2<0.5$, and $a2+b2+c2=1$.

In the combination of the first positive electrode active material and the second positive electrode active material, a high output is expected at both the low SOC and the intermediate SOC.

[4] A non-aqueous electrolyte solution secondary battery in the present disclosure includes: a positive electrode; a negative electrode; and a non-aqueous electrolyte solution.

The positive electrode includes a positive electrode composite layer. The positive electrode composite layer includes a first composite material and a second composite material. The first composite material contains a first positive electrode active material, a first conductive material, and a first binder. The second composite material contains a second positive electrode active material, a second conductive material, and a second binder.

The first positive electrode active material has an average discharge potential lower than an average discharge potential of the second positive electrode active material. The first positive electrode active material has a mass ratio of 10 mass % or more and 50 mass % or less with respect to a total of the first positive electrode active material and the second positive electrode active material.

The first conductive material has a first oil absorption number with respect to 100 parts by mass of the first positive electrode active material. The second conductive material has a second oil absorption number with respect to 100 parts by mass of the second positive electrode active material. A ratio of the second oil absorption number to the first oil absorption number is 1.3 or more and 2.1 or less. A sum of the first oil absorption number and the second oil absorption number is 31.64 ml/100 g or less.

The non-aqueous electrolyte solution secondary battery according to [4] above is typically manufactured by the method of manufacturing the non-aqueous electrolyte solution secondary battery according to [1] above.

The positive electrode composite layer according to [4] above includes: the first positive electrode active material having a relatively low average discharge potential; and the second positive electrode active material having a relatively high average discharge potential. The first positive electrode active material has a mass ratio of 10 mass % or more and 50 mass % or less. Accordingly, the non-aqueous electrolyte solution secondary battery attains a high output in a wide SOC range (both the low SOC and the intermediate SOC). When the mass ratio of the first positive electrode active material is less than 10 mass %, the output at the low SOC may be insufficient from an initial stage. When the mass ratio of the first positive electrode active material is more than 50 mass %, the output at the intermediate SOC may be insufficient from the initial stage.

In the positive electrode composite layer according to [4] above, the oil absorption number ratio is 1.3 or more and 2.1 or less. Accordingly, the amount of the non-aqueous electrolyte solution is relatively small around the first positive electrode active material reacting more preferentially in accordance with the potential, whereas the amount of the non-aqueous electrolyte solution is relatively large around the second positive electrode active material reacting less preferentially in accordance with the potential. Accordingly, during the charging/discharging, both the first positive electrode active material and the second positive electrode active material are used in good balance. As a result, the high output can be maintained in a wide SOC range after the charging/discharging cycle.

In the positive electrode composite layer according to [4] above, the oil absorption number sum is 31.64 ml/100 g or less. When the oil absorption number sum is more than 31.64 ml/100 g, the conductive material becomes excessive with respect to the positive electrode active material. Accordingly, the capacity maintenance ratio after the charging/discharging cycle may be decreased.

Thus, the non-aqueous electrolyte solution secondary battery according to [4] above attains a high output in a wide SOC range (both the low SOC and the intermediate SOC) and is excellent in cycle durability.

[5] In the non-aqueous electrolyte solution secondary battery according to [4], the sum of the first oil absorption number and the second oil absorption number may be 15.36 ml/100 g or more.

When the oil absorption number sum is small, the absolute amount of the non-aqueous electrolyte solution in the positive electrode composite layer is decreased, with the result that the effect of improving the cycle durability becomes presumably small. The lower limit value of the oil absorption number sum may be 15.36 ml/100 g, for example.

[6] In the non-aqueous electrolyte solution secondary battery according to [4] or [5], the first positive electrode active material may have a first composition represented by $LiNi_{a1}Co_{b1}Mn_{c1}O_2$ (formula (I)) where $0.3<a1<0.5$, $0.4<b1<0.6$, $0<c1<0.2$, and $a1+b1+c1=1$, and the second positive electrode active material may have a second composition represented by $LiNi_{a2}Co_{b2}Mn_{c2}O_2$ (formula (II)) where $0.3<a2<0.5$, $0.1<b2<0.3$, $0.3<c2<0.5$, and $a2+b2+c2=1$.

In the combination of the first positive electrode active material and the second positive electrode active material, a high output is expected at both the low SOC and the intermediate SOC.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (hereinafter, referred to as "the present embodiment") of the present disclosure will be described. However, the description below is not intended to limit the scope of claims. In the description below, a method of manufacturing a lithium ion secondary battery and the lithium ion secondary battery will be described as typical examples. However, the non-aqueous electrolyte solution secondary battery of the present disclosure is not necessarily limited to the lithium ion secondary battery. In the description below, the non-aqueous electrolyte solution secondary battery may be simply described as "battery".

<Method of Manufacturing Non-Aqueous Electrolyte Solution Secondary Battery>

Figure 1:
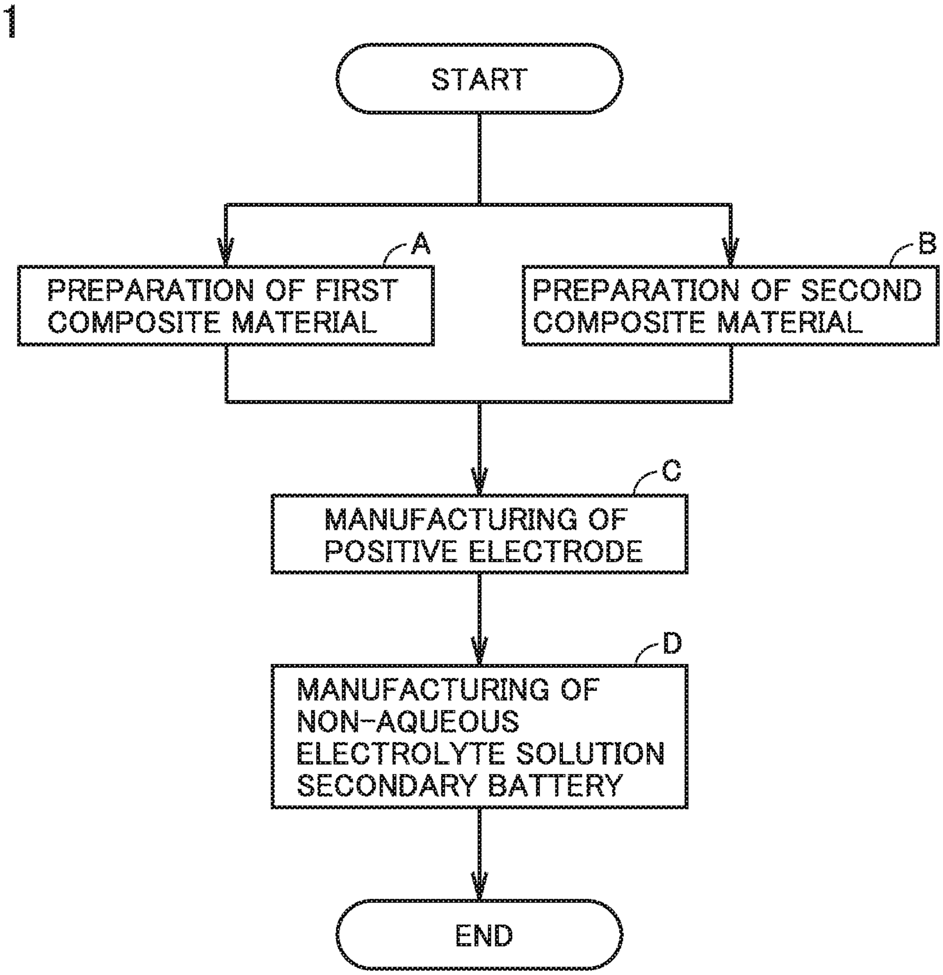
FIG. 1 is a flowchart schematically showing a method of manufacturing a non-aqueous electrolyte solution secondary battery according to an embodiment of the present disclosure.

FIG. 1 is a flowchart schematically showing a method of manufacturing a non-aqueous electrolyte solution secondary battery of the present embodiment. The method of manufacturing the non-aqueous electrolyte solution secondary battery includes: (A) preparation of a first composite material; (B) preparation of a second composite material; (C) manufacturing of a positive electrode; and (D) manufacturing of the non-aqueous electrolyte solution secondary battery. The following describes the sequence of the method of manufacturing the non-aqueous electrolyte solution secondary battery.

<<(A) Preparation of First Composite Material and (B) Preparation of Second Composite Material>>

The method of manufacturing the non-aqueous electrolyte solution secondary battery in the present embodiment includes: (A) preparing the first composite material by mixing a first positive electrode active material, a first conductive material, and a first binder; and (B) preparing the second composite material by mixing a second positive electrode active material, a second conductive material, and a second binder.

The first composite material and the second composite material are prepared separately. Each of the first composite material and the second composite material can be prepared by a conventionally known method. For example, the positive electrode active material, the conductive material, and the binder may be mixed with a solvent, thereby preparing dispersion (slurry) including the composite material. Alternatively, the positive electrode active material, the conductive material, and the binder may be mixed with a solvent, thereby preparing granules including the composite material. For the mixing, a general agitator/mixer may be used. For the sake of reference, the mixture can be slurry when the mixture has a solid content ratio of about 50 to 60 mass %, whereas the mixture can be granules when the mixture has a solid content ratio of about 70 to 80 mass %. The solid content ratio represents a ratio of the mass of the components other than the solvent in the mixture.

The solvent is desirably introduced to the mixture step by step. For example, first, a small amount of the solvent, the positive electrode active material, the conductive material, and the binder are mixed. Accordingly, a composite particle aggregate (composite material) in which the conductive material is adhered to a surface of the positive electrode active material is prepared. In this case, the mixture is in the form of wet powder. The solvent is added to the mixture and is further mixed therewith, thereby dispersing the composite material in the solvent to prepare the slurry.

The composite material can be prepared to contain 80 to 98 mass % of the positive electrode active material, 1 to 15 mass % of the conductive material, and 1 to 5 mass % of the binder, for example. The binder binds the positive electrode active material to the conductive material. The binder is not particularly limited. The binder is typically a high molecular compound. Examples of the binder may include polyvinylidene fluoride (PVdF), polytetrafluoroethylene (PTFE), polyacrylic acid (PAA), and the like. The solvent is selected appropriately in consideration of dispersibility of the binder in the solvent. When the binder is PVdF, N-methyl-2-pyrrolidone (NMP) may be used as the solvent, for example. In the present embodiment, the first binder may be the same as or different from the second binder.

(First Positive Electrode Active Material and Second Positive Electrode Active Material)

The positive electrode active material is a compound in which lithium ions ($Li^+$) can enter or leave voids in the crystal structure. The entering/leaving of the lithium ions is referred to as "intercalation reaction". The positive electrode active material typically contains a transition metal. The entering/leaving of $Li^+$ causes redox of the transition metal. Accordingly, exchange of electrons, i.e., charging/discharging is performed. The positive electrode active material may have an average particle size of about 1 to 20 μm, for example. It is assumed that the "average particle size" in the present specification represents the size of particles at an integrated value of 50% from the finest particle in volume-based particle size distribution measured by a laser diffraction scattering method.

The first positive electrode active material has an average discharge potential lower than that of the second positive electrode active material. The combination of the first positive electrode active material and the second positive electrode active material should not be particularly limited as long as this condition is satisfied. The "average discharge potential [V vs. $Li/Li^+$]" is measured by a single-electrode test for the positive electrode active material. For the single-electrode test, a general three-electrode type cell and a charging/discharging device are used. The single-electrode test is performed, for example, under the following conditions:

Area of the working electrode: about 10 $cm^2$

Counter electrode and reference electrode: lithium

Potential range: about 3.0 to 4.1 V vs. $Li/Li^+$

Current density: about 0.2 $mA/cm^2$

Figure 2:
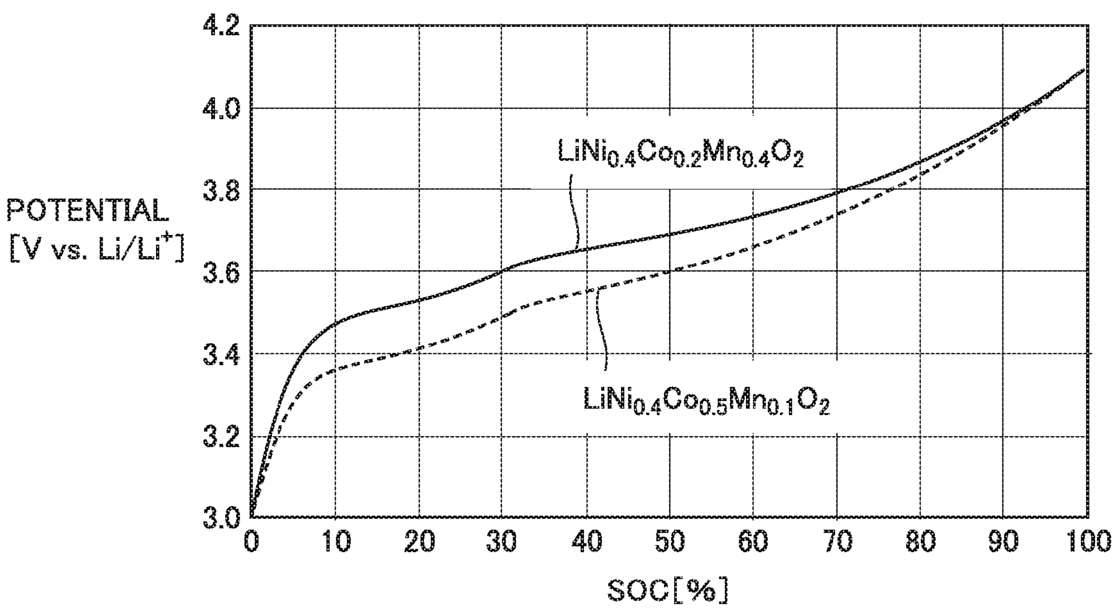
FIG. 2 is a graph showing exemplary discharge curves of positive electrode active materials.

Results of the single-electrode test are plotted in orthogonal coordinates in which a horizontal axis represents discharging capacity and a vertical axis represents potential. Accordingly, a discharge curve of the positive electrode active material is obtained. The horizontal axis may be standardized with the full charge capacity as an SOC of 100%. FIG. 2 is a graph showing an exemplary discharge curve of each of positive electrode active materials. Through definite integral, the area of a geometry surrounded by the discharge curve and the horizontal axis is calculated. The area in this graph corresponds to an amount of electric power (Wh). By dividing the area (Wh) by the discharge capacity (Ah), the average discharge potential (V vs. $Li/Li^+$) is calculated.

The description below provides a list of compounds that can serve as the first positive electrode active material and the second positive electrode active material. However, the compounds below are just exemplary and the first positive electrode active material and the second positive electrode active material should not be limited thereto. Also, the average discharge potential is for the sake of reference and may be increased or decreased depending on synthetic conditions, an influence of a small amount of added element, and the like.

$LiCoO_2$ (average discharge potential of about 3.65 to 3.75 V vs. $Li/Li^+$)

$LiNiO_2$ (average discharge potential of about 3.55 to 3.65 V vs. $Li/Li^+$)

$LiMn_2O_4$ (average discharge potential of about 3.85 to 3.95 V vs. $Li/Li^+$)

$LiNi_{1/3}Co_{1/3}Mn_{1/3}O_2$ (average discharge potential of about 3.60 to 3.70 V vs. $Li/Li^+$)

$LiFePO_4$ (average discharge potential of about 3.30 to 3.40 V vs. $Li/Li^+$)

In the present embodiment, for example, the following combinations can be considered: a combination of the first positive electrode active material composed of $LiFePO_4$ and the second positive electrode active material composed of $LiNi_{1/3}Co_{1/3}Mn_{1/3}O_2$; a combination of the first positive electrode active material composed of $LiNi_{1/3}Co_{1/3}Mn_{1/3}O_2$ and the second positive electrode active material composed of $LiMn_2O_4$; and the like.

There is also considered a combination of the first positive electrode active material and the second positive electrode active material both containing the following three elements: nickel (Ni), cobalt (Co), and manganese (Mn). The positive electrode active material containing the three elements of Ni, Co, and Mn (so-called "ternary positive electrode active material") tends to be excellent in balance among capacity, output, thermal stability, and the like.

For example, there can be considered a combination of the first positive electrode active material having a first composition represented by the above-mentioned formula (I) and the second positive electrode active material having a second composition represented by the above-mentioned formula (II). With this combination, a high output is expected at both the low SOC and the intermediate SOC. $LiNi_{0.4}Co_{0.5}Mn_{0.1}O_2$ shown in FIG. 2 is an exemplary positive electrode active material having the first composition, and $LiNi_{0.4}Co_{0.2}Mn_{0.4}O_2$ is an exemplary positive electrode active material having the second composition. $LiNi_{0.4}Co_{0.5}Mn_{0.1}O_2$ has an average discharge potential of about 3.77 V vs. $Li/Li^+$, whereas $LiNi_{0.4}Co_{0.2}Mn_{0.4}O_2$ has an average discharge potential of about 3.82 V vs. $Li/Li^+$.

Each of the above-mentioned positive electrode active materials may contain a small amount of added element in addition to the elements included in the composition formula. Examples of the small amount of added element include magnesium (Mg), aluminum (Al), silicon (Si), calcium (Ca), titanium (Ti), vanadium (V), chromium (Cr), zinc (Zn), gallium (Ga), zirconium (Zr), niobium (Nb), molybdenum (Mo), tin (Sn), hafnium (Hf), tungsten (W), and the like. The amount of addition thereof is about 0.01 to 0.1 mol %, for example. Due to an influence of the small amount of added element, the average discharge potential may be changed.

(First Conductive Material and Second Conductive Material)

The conductive material has an electron conductivity higher than that of the positive electrode active material. The conductive material can hold a nonaqueous electrolytic solution in its internal space. Typically, the conductive material is a carbon material. Examples of the carbon material that can serve as the conductive material include: carbon black such as acetylene black (AB), thermal black, or furnace black; vapor grown carbon fiber (VGCF); carbon nanotube (CNT); graphene; graphite; and the like. The conductive material has an average particle size of about 0.1 to 10 μm, for example.

The first conductive material has a first oil absorption number with respect to 100 parts by mass of the first positive electrode active material. The second conductive material has a second oil absorption number with respect to 100 parts by mass of the second positive electrode active material. A ratio (oil absorption number ratio) of the second oil absorption number to the first oil absorption number is 1.3 or more and 2.1 or less. The sum (oil absorption number sum) of the first oil absorption number and the second oil absorption number is 31.64 ml/100 g or less. The first conductive material and the second conductive material should not be particularly limited as long as these conditions are satisfied.

The description below provides a list of materials that can serve as the first conductive material and the second conductive material. However, the materials below are just exemplary and the first conductive material and the second conductive material should not be limited thereto. Also, the unit oil absorption number is for the sake of reference, and may be increased or decreased depending on synthetic conditions for the materials, and the like.

Graphene (unit oil absorption number of 50 to 150 ml/100 g)

AB (unit oil absorption number of 200 to 300 ml/100 g)

VGCF (unit oil absorption number of 500 to 600 ml/100 g)

The "unit oil absorption number [ml/100 g]" represents an oil absorption number measured by a method in compliance with "JIS K 6217-4; Carbon black for rubber industry—Fundamental characteristics—Part 4: Determination of oil absorption number (OAN) and oil absorption number of compressed sample (COAN)". For the oil, dibutyl phthalate (DBP) is used.

The first oil absorption number is a value with respect to 100 parts by mass of the first positive electrode active material. The first oil absorption number is determined as a product of the unit oil absorption number and a blending amount of the first conductive material with respect to 100 parts by mass of the first positive electrode active material. For example, when 4 parts by mass of acetylene black (AB) having a unit oil absorption number of 256 ml/100 g is blended with respect to 100 parts by mass of the first positive electrode active material, the first oil absorption number is 10.24 ml/100 g in accordance with the following formula:

$$(\text{First oil absorption number}) = 256\ [\text{ml}/100\ \text{g}] \times 4\ [\text{parts by mass}]/100\ [\text{parts by mass}].$$

The same applies to the second oil absorption number.

In the present embodiment, the type of each conductive material is selected such that the ratio (oil absorption number ratio) of the second oil absorption number to the first oil absorption number is 1.3 or more and 2.1 or less, thereby determining blending of the first composite material and the second composite material. In other words, the positive electrode composite layer is formed to attain an oil absorption number ratio of 1.3 or more and 2.1 or less. When the oil absorption number ratio is less than 1.3, the first positive electrode active material reacts preferentially to result in a large decrease in output at the low SOC after a charging/discharging cycle. When the oil absorption number ratio is more than 2.1, the second positive electrode active material reacts preferentially to result in a large decrease in output at the intermediate SOC. The oil absorption number ratio may be, for example, 1.5 or more or 1.6 or more as long as the oil absorption number ratio is 1.3 or more. The oil absorption number ratio may be, for example, 1.7 or less as long as the oil absorption number ratio is 2.1 or less.

In the present embodiment, the type of each conductive material is selected such that the sum (oil absorption number sum) of the first oil absorption number and the second oil absorption number becomes 31.64 ml/100 g or less, thereby determining blending of the first composite material and the second composite material. In other words, the positive electrode composite layer is formed to attain an oil absorption number sum of 31.64 ml/100 g or less. When the oil absorption number sum is more than 31.64 ml/100 g, the conductive material becomes excessive with respect to the positive electrode active material. This may result in a decreased capacity maintenance ratio after the charging/discharging cycle. As long as the oil absorption number sum is 31.64 ml/100 g or less, the oil absorption number sum may be 31.50 ml/100 g or less, 26.29 ml/100 g or less, or 25.6 ml/100 g or less, for example.

When the oil absorption number sum is small, the absolute amount of the non-aqueous electrolyte solution in the positive electrode composite layer is decreased, with the result that an effect of improving the cycle durability becomes presumably small. In view of this, the type of each conductive material is selected such that the oil absorption number sum becomes 15.36 ml/100 g or more, thereby determining blending of the first composite material and the second composite material. In other words, the positive electrode composite layer may be formed to attain an oil absorption number sum of 15.36 ml/100 g or more. The oil absorption number sum may be 16.3 ml/100 g or more, or 18.32 ml/100 g or more.

The first oil absorption number may be 5.12 ml/100 g or more and 10.24 ml/100 g or less, for example. The second oil absorption number may be 10.24 ml/100 g or more and 21.4 ml/100 g or less, for example.

<<(C) Manufacturing of Positive Electrode>>

The manufacturing method of the present embodiment includes (C) manufacturing the positive electrode by forming the positive electrode composite layer including the first composite material and the second composite material.

The positive electrode is typically a sheet having a strip-like shape or a rectangular shape. The positive electrode can be manufactured as follows. First, the first composite material and the second composite material are mixed at a predetermined blending ratio. Accordingly, the positive electrode composite material including the first composite material and the second composite material is prepared. The positive electrode composite material is disposed on a surface of a current collecting foil in the form of a layer, thereby forming a positive electrode composite layer. Accordingly, the positive electrode is manufactured. The current collecting foil is not particularly limited. The current collecting foil may be an Al foil or the like, for example. The Al foil may have a thickness of about 5 to 30 μm, for example.

In order to dispose the positive electrode composite material, a general coating device is used. When slurry including the positive electrode composite material is prepared, a surface of the current collecting foil is coated with the slurry using, for example, a die coater and is then dried. Accordingly, the positive electrode composite layer is formed. When granules including the positive electrode composite material are prepared, a surface of the current collecting foil is coated with the granules using, for example, a roll coater and is then dried. Accordingly, the positive electrode composite layer is formed. It is assumed that the positive electrode is processed into a predetermined size (thickness, area) in accordance with the specification of the battery. The processing herein includes rolling and cutting. The positive electrode is processed such that the positive electrode composite layer has a thickness of about 10 to 150 μm, for example.

The blending ratio of the first composite material and the second composite material is determined such that the first positive electrode active material has a mass ratio of 10 mass % or more and 50 mass % or less with respect to a total of the first positive electrode active material and the second positive electrode active material. In other words, the positive electrode composite layer is formed such that the first positive electrode active material has a mass ratio of 10 mass % or more and 50 mass % or less. When the mass ratio of the first positive electrode active material is less than 10 mass %, the output at the low SOC may be insufficient from an initial stage. When the mass ratio of the first positive electrode active material is more than 50 mass %, the output at the intermediate SOC may be insufficient from the initial stage. The mass ratio of the first positive electrode active material is preferably 40 mass % or more and 50 mass % or less. Accordingly, it is expected that a difference between the output at the low SOC and the output at the intermediate SOC becomes small.

<<(D) Manufacturing of Non-Aqueous Electrolyte Solution Secondary Battery>>

The manufacturing method of the present embodiment includes (D) manufacturing the non-aqueous electrolyte solution secondary battery including the positive electrode, the negative electrode, and the non-aqueous electrolyte solution. Here, the negative electrode is first manufactured in accordance with the specification of the battery, and the nonaqueous electrolyte is then prepared.

(Manufacturing of Negative Electrode)

The negative electrode is typically a sheet having a strip-like shape or a rectangular shape. A surface of a current collecting foil is coated with slurry including a negative electrode composite material and is then dried, thereby forming a negative electrode composite material layer. Accordingly, the negative electrode is manufactured. The current collecting foil may be a copper (Cu) foil or the like, for example. The Cu foil may have a thickness of about 5 to 30 μm, for example.

The negative electrode composite material contains 95 to 99 mass % of a negative electrode active material and 1 to 5 mass % of a binder, for example. Examples of the negative electrode active material may include graphite, soft carbon, hard carbon, silicon, silicon monoxide, tin, and the like. Examples of the binder may include carboxymethylcellulose (CMC), styrene-butadiene rubber (SBR), polyacrylic acid (PAA), and the like.

It is assumed that the negative electrode is processed into a predetermined size in accordance with the specification of the battery. The processing herein includes rolling and cutting. The negative electrode is processed such that the negative electrode composite material layer has a thickness of about 10 to 150 μm, for example.

(Preparation of Non-Aqueous Electrolyte Solution)

The non-aqueous electrolyte solution is prepared by dissolving a supporting electrolyte salt in an aprotic solvent. The aprotic solvent may be a mixture of a cyclic carbonate and a chain carbonate, for example. Examples of the cyclic carbonate include ethylene carbonate (EC), propylene carbonate (PC), 1,2-butylene carbonate, and the like. Examples of the chain carbonate include dimethyl carbonate (DMC), ethyl methyl carbonate (EMC), diethyl carbonate (DEC), and the like. The mixture ratio of the cyclic carbonate and the chain carbonate may be about "1:9 to 5:5" in a volume ratio, for example.

Examples of the supporting electrolyte salt may include Li salts such as $LiPF_6$, $LiBF_4$ and $Li[N(FSO_2)_2]$. The non-aqueous electrolyte solution may contain two or more types of Li salts. The supporting electrolyte salt may have a concentration of 0.5 to 1.5 mol/l, for example.

(Assembly)

An electrode group including the positive electrode and the negative electrode is constructed. The electrode group may include a separator. The separator is disposed between the positive electrode and the negative electrode. The electrode group may be a wound type electrode group or a stack type electrode group. The wound type electrode group is constructed by layering and winding a strip-like positive electrode, a strip-like separator, and a strip-like negative electrode in this order. The stack type electrode group is constructed by alternately layering a rectangular positive electrode and a rectangular negative electrode with a rectangular separator interposed therebetween.

The separator may have a thickness of about 5 to 30 μm, for example. The separator may be a porous membrane composed of polyethylene (PE), a porous membrane composed of polypropylene (PP), or the like, for example. The separator may have a multilayer structure. The separator may be constructed by layering a porous membrane composed of PP, a porous membrane composed of PE and a porous membrane composed of PP in this order, for example. The separator may have a heat-resistant layer on its surface. The heat-resistant layer contains inorganic particles such as alumina, for example.

The electrode group is inserted in a battery case. The non-aqueous electrolyte solution is injected into the battery case. Then, the battery case is sealed. In this way, the non-aqueous electrolyte solution secondary battery including the positive electrode, the negative electrode, and the non-aqueous electrolyte solution is manufactured.

<Non-Aqueous Electrolyte Solution Secondary Battery>

Figure 3:
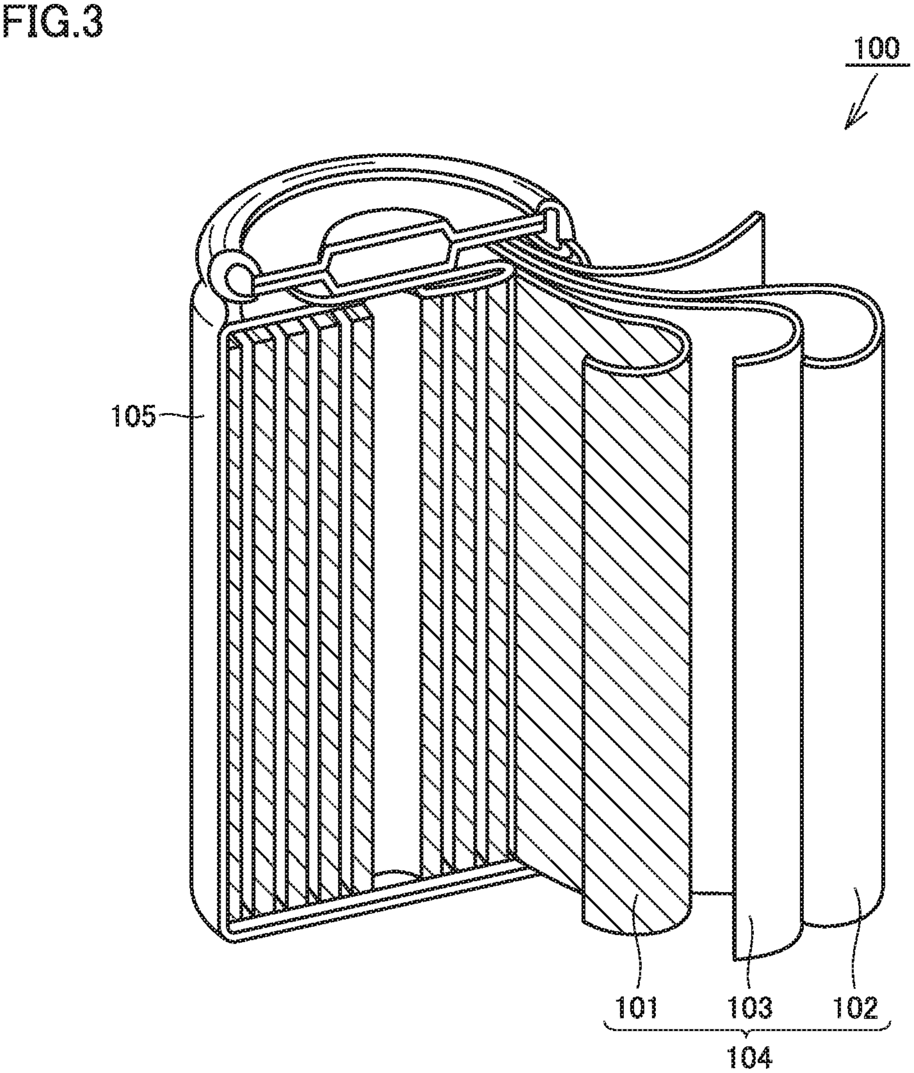
FIG. 3 is a schematic view showing an exemplary configuration of the non-aqueous electrolyte solution secondary battery according to the embodiment of the present disclosure.

FIG. 3 is a schematic view showing an exemplary configuration of the non-aqueous electrolyte solution secondary battery of the present embodiment. FIG. 3 shows a battery having a cylindrical shape. However, this is just exemplary. The non-aqueous electrolyte solution secondary battery of the present embodiment may be a battery having a prismatic shape, or a laminate-type battery.

Battery 100 includes a battery case 105. In battery case 105, electrode group 104 and the non-aqueous electrolyte solution (not shown) are provided. Electrode group 104 is electrically connected to a terminal portion of battery case 105. Electrode group 104 includes positive electrode 101, negative electrode 102, and separator 103. That is, battery 100 includes positive electrode 101, negative electrode 102, and the non-aqueous electrolyte solution.

Positive electrode 101, negative electrode 102, and separator 103 constitute a wound type electrode group 104. Separator 103 is disposed between positive electrode 101 and negative electrode 102. The non-aqueous electrolyte solution is held in spaces at positive electrode 101, negative electrode 102, and separator 103.

Figure 4:
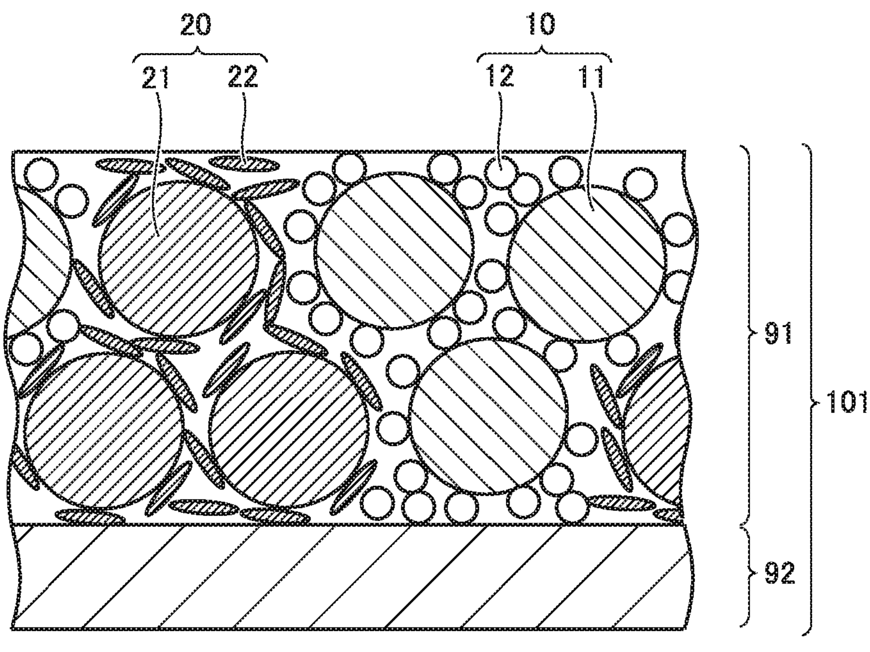
FIG. 4 is a conceptual view showing a configuration of a positive electrode according to the embodiment of the present disclosure.

FIG. 4 is a conceptual view showing the configuration of the positive electrode according to the present embodiment. Positive electrode 101 includes a positive electrode composite layer 91. Positive electrode composite layer 91 is formed on a surface of a current collecting foil 92. Positive electrode composite layer 91 includes a first composite material 10 and a second composite material 20. First composite material 10 contains a first positive electrode active material 11, a first conductive material 12, and a first binder (not shown). Second composite material 20 contains a second positive electrode active material 21, a second conductive material 22, and a second binder (not shown).

First positive electrode active material 11 has an average discharge potential lower than that of second positive electrode active material 21. First positive electrode active material 11 has a mass ratio of 10 mass % or more and 50 mass % or less with respect to the total of first positive electrode active material 11 and second positive electrode active material 21. Accordingly, battery 100 can attain a high output in a wide SOC range. The mass ratio of first positive electrode active material 11 is preferably 40 mass % or more and 50 mass % or less. Accordingly, it is expected that a difference between the output at the low SOC and the output at the intermediate SOC becomes small.

First composite material 10 is prepared by mixing first positive electrode active material 11, first conductive material 12, and the first binder. The first binder binds first positive electrode active material 11 to first conductive material 12. First conductive material 12 is adhered to the surface of first positive electrode active material 11. First conductive material 12 may surround first positive electrode active material 11. First conductive material 12 may cover the surface of first positive electrode active material 11.

Second composite material 20 is prepared by mixing second positive electrode active material 21, second conductive material 22, and the second binder. The second binder binds second positive electrode active material 21 to second conductive material 22. Second conductive material 22 is adhered to the surface of second positive electrode active material 21. Second conductive material 22 may surround second positive electrode active material 21. Second conductive material 22 may cover the surface of second positive electrode active material 21.

Since first positive electrode active material 11 has an average discharge potential relatively lower than that of second positive electrode active material 21, first positive electrode active material 11 reacts more preferentially. This tends to accelerate deterioration of first positive electrode active material 11 during charging/discharging.

In the present embodiment, first conductive material 12 and second conductive material 22 satisfy a specific relation. Specifically, first conductive material 12 has the first oil absorption number with respect to 100 parts by mass of first positive electrode active material 11. Second conductive material 22 has the second oil absorption number with respect to 100 parts by mass of second positive electrode active material 21. The ratio (oil absorption number ratio) of the second oil absorption number to the first oil absorption number is 1.3 or more and 2.1 or less. The sum (oil absorption number sum) of the first oil absorption number and the second oil absorption number is 31.64 ml/100 g or less.

Accordingly, a reaction between first positive electrode active material 11 and the non-aqueous electrolyte solution is suppressed while accelerating a reaction between second positive electrode active material 21 and the non-aqueous electrolyte solution. In this way, both first positive electrode active material 11 and second positive electrode active material 21 are used in good balance during charging/discharging. As a result, the high output can be maintained in a wide SOC range after the charging/discharging cycle. Further, since the oil absorption number sum is 31.64 ml/100 g or less, the capacity maintenance ratio after the charging/discharging cycle is suppressed from being decreased.

The oil absorption number sum may be 15.36 ml/100 g or more, 16.3 ml/100 g or more, or 18.32 ml/100 g or more, for example.

The first oil absorption number may be 5.12 ml/100 g or more and 10.24 ml/100 g or less, for example. The second oil absorption number may be 10.24 ml/100 g or more and 21.4 ml/100 g or less, for example.

First positive electrode active material 11 may have the first composition represented by the above-mentioned formula (I) and second positive electrode active material 21 may have the second composition represented by the above-mentioned formula (II). With this combination, a high output is expected at both the low SOC and the intermediate SOC. Such a ternary positive electrode active material tends to be excellent in balance among capacity, output, thermal stability, and the like.

As described above, the non-aqueous electrolyte solution secondary battery of the present embodiment attains a high output in a wide SOC range and is also excellent in cycle durability. The non-aqueous electrolyte solution secondary battery having such performance is particularly suitable as an electric power supply for motive power in a hybrid vehicle (HV), an electric vehicle (EV), and the like, for example. However, the non-aqueous electrolyte solution secondary battery of the present embodiment is not limited to such an in-vehicle application, and is applicable to any applications.

EXAMPLES

Hereinafter, Examples will be described. The examples below, however, do not limit the scope of claims.

<Manufacturing of Non-Aqueous Electrolyte Solution Secondary Battery>

Non-aqueous electrolyte solution secondary batteries according to Examples 1 to 9 and Comparative Examples 1 to 17 were manufactured as follows.

Example 1

(A) Preparation of First Composite Material

The following materials were prepared.

First positive electrode active material: $LiNi_{0.4}Co_{0.5}Mn_{0.1}O_2$ (average particle size of 10 μm)

First conductive material: AB (unit oil absorption number of 256 ml/100 g)

First binder: PVdF

Solvent: NMP

The first positive electrode active material, the first conductive material, the first binder, and the solvent were mixed. Accordingly, a first composite material was prepared. There was 4 parts by mass of the first conductive material with respect to 100 parts by mass of the first positive electrode active material. There was 17 parts by mass of the solvent with respect to 100 parts by mass of the first positive electrode active material. 42 parts by mass of the solvent was added to the mixture with respect to 100 parts by mass of the first positive electrode active material. The mixture was agitated, thereby dispersing the first composite material in the solvent. Accordingly, slurry including the first composite material was prepared. In this example, the first oil absorption number is 10.24 ml/100 g in accordance with the following formula: "256 [ml/100 g]×4 [parts by mass]/100 [parts by mass]".

(B) Preparation of Second Composite Material

The following materials were prepared.

Second positive electrode active material: $LiNi_{0.4}Co_{0.2}Mn_{0.4}O_2$ (average particle size of 7 μm)

Second conductive material: VGCF (unit oil absorption number of 535 ml/100 g)

Second binder: PVdF

Solvent: NMP

The second positive electrode active material, the second conductive material, the second binder, and the solvent were mixed. Accordingly, a second composite material was prepared. There was 4 parts by mass of the second conductive material with respect to 100 parts by mass of the second positive electrode active material. There was 17 parts by mass of the solvent with respect to 100 parts by mass of the second positive electrode active material. 42 parts by mass of the solvent was added to the mixture with respect to 100 parts by mass of the second positive electrode active material. The mixture was agitated, thereby dispersing the second composite material in the solvent. Accordingly, slurry including the second composite material was prepared. In this example, the second oil absorption number is 21.4 ml/100 g in accordance with the following formula: "535 [ml/100 g]×4 [parts by mass]/100 [parts by mass]".

(C) Manufacturing of Positive Electrode

The slurry including the first composite material and the slurry including the second composite material were mixed to attain the following mass ratio: "the first composite material:the second composite material=4:6". Accordingly, slurry including the positive electrode composite material was prepared. In this positive electrode composite material, the first positive electrode active material has a mass ratio of 40 mass % with respect to the total of the first positive electrode active material and the second positive electrode active material.

As a current collecting foil, an Al foil having a thickness of 15 μm was prepared. A surface of the current collecting foil was coated with the slurry including the positive electrode composite material and was then dried, thereby forming a positive electrode composite layer. Accordingly, a positive electrode was manufactured. The coating mass (after drying) of the positive electrode composite layer was 30 $mg/cm^2$. The positive electrode composite layer includes the first composite material and the second composite material. The positive electrode was rolled and was cut into a shape of strip. The thickness of the positive electrode composite layer after the rolling was 45 μm.

(D) Manufacturing of Non-Aqueous Electrolyte Solution Secondary Battery

The following materials were prepared.

Negative electrode active material: natural graphite (average particle size of 10 μm)

Binder: CMC and SBR

Solvent: water

The negative electrode active material, the binder, and the solvent were mixed. Accordingly, slurry including a negative composite material was prepared. As a current collecting foil, a Cu foil having a thickness of 10 μm was prepared. A surface of the current collecting foil was coated with the slurry including the negative electrode composite material and was then dried, thereby forming a negative electrode composite material layer. Accordingly, a negative electrode was manufactured. The coating mass (after drying) of the negative electrode composite material layer was 18 $mg/cm^2$. The negative electrode was rolled and was cut into a shape of strip. The thickness of the negative electrode composite material layer after rolling was 90 μm.

As a separator, a strip-like porous membrane (composed of PE) was prepared. The positive electrode, the separator, and the negative electrode were layered and wound, thereby constructing a wound type electrode group. A cylindrical battery case was prepared which had a diameter of 18 mm and a height of 65 mm. The electrode group was inserted into the battery case. The electrode group was electrically connected to a terminal portion of the battery case.

A non-aqueous electrolyte solution having the following composition was prepared:

1.0 mol/l $LiPF_6$, EC:EMC:DMC=3:4:3 (v:v:v)

The non-aqueous electrolyte solution was injected into the battery case. The battery case was sealed. In this way, a non-aqueous electrolyte solution secondary battery including the positive electrode, the negative electrode, and the non-aqueous electrolyte solution was manufactured. This non-aqueous electrolyte solution secondary battery is a cylindrical lithium ion secondary battery having a rated capacity of 500 mAh.

Example 2 and Comparative Examples 1 to 4

Non-aqueous electrolyte solution secondary batteries were manufactured in the same procedure as that in Example 1 except that the respective blending amounts of the second conductive materials in the second composite materials were changed to attain second oil absorption numbers shown in Table 1 below.

In Table 1 below, samples with “*” represent comparative examples. For example, “Sample *1” represents Comparative Example 1. Samples without “*” represent Examples. For example, “Sample 1” represents Example 1.

Examples 3, 4 and Comparative Examples 5 to 9

In each of Examples 3, 4 and Comparative Examples 5 to 9, AB (unit oil absorption number of 256 ml/100 g) was used as each of the first conductive material and the second conductive material. Non-aqueous electrolyte solution secondary batteries were manufactured in the same procedure as that in Example 1 except that the respective blending amounts of the first conductive materials in the first composite materials and the respective blending amounts of the second conductive materials in the second composite materials were changed to attain first oil absorption numbers and second oil absorption numbers shown in Table 1.

Examples 5, 6 and Comparative Examples 10 to 12

As the first conductive material, graphene (unit oil absorption number of 101 ml/100 g) was prepared. Non-aqueous electrolyte solution secondary batteries were manufactured in the same procedure as that in Example 3 except that the respective blending amounts of the first conductive materials in the first composite materials were changed to attain first oil absorption numbers shown in Table 1 below.

Example 7 and Comparative Examples 13 to 15

In each of Example 7 and Comparative Examples 13 to 15, graphene (unit oil absorption number of 101 ml/100 g) was used as the first conductive material, and VGCF (unit oil absorption number of 535 ml/100 g) was used as the second conductive material. Non-aqueous electrolyte solution secondary batteries were manufactured in the same procedure as that in Examples 1 and 5 except that the respective blending amounts of the first conductive materials in the first composite materials and the respective blending amounts of the second conductive materials in the second composite materials were changed to attain first oil absorption numbers and second oil absorption numbers shown in Table 1 below.

Examples 8, 9 and Comparative Examples 16, 17

Non-aqueous electrolyte solution secondary batteries were manufactured in the same procedure as that in Example 1 except that the respective blending ratios of the first composite materials and the second composite materials were changed such that the first positive electrode active materials had mass ratios shown in Table 1 below.

TABLE 1

| | Positive Electrode Composite Layer | | | | | | | | Battery Performance | | | | |
|---|---|---|---|---|---|---|---|---|---|---|---|---|
| | First Composite Material First Postive Electrode Active Material (X1) $LiNi_{0.4}Co_{0.5}Mn_{0.1}O_2$ First Conductive Material | | Second Composite Material Second Postive Electrode Active Material (X2) $LiNi_{0.4}Co_{0.2}Mn_{0.4}O_2$ Second Conductive Material | | | | | Initial Stage | | After Cycle | | |
| Sample | Type | First Oil Absorption Number (Y1) [ml/100 g] | Type | Second Oil Absorption Number (Y2) [ml/100 g] | Mass Ratio of First Positive Electrode Active Material X1/(X1 + X2) [mass %] | Oil Absorption Number Ratio Y2/Y1 [—] | Oil Absorption Number Sum Y1 + Y2 [ml/100 g] | Low SOC IV Resistance SOC = 20% [mΩ] | Intermediate SOC IV Resistance SOC = 50% [mΩ] | Low SOC IV Resistance SOC = 20% [mΩ] | Intermediate SOC IV Resistance SOC = 50% [mΩ] | Capacity Maintenace Ratio [%] |
| 1 | AB | 10.24 | VGCF | 21.4 | 40 | 2.1 | 31.64 | 15.88 | 10.07 | 18.30 | 20.40 | 75.34 |
| 2 | AB | 10.24 | VGCF | 16.05 | 40 | 1.6 | 26.29 | 16.16 | 10.89 | 18.30 | 20.30 | 74.99 |
| *1 | AB | 10.24 | VGCF | 10.7 | 40 | 1.0 | 20.94 | 16.14 | 12.12 | 56.70 | 23.30 | 70.30 |
| *2 | AB | 10.24 | VGCF | 5.35 | 40 | 0.5 | 15.59 | 16.38 | 14.20 | 76.70 | 33.00 | 55.60 |
| *3 | AB | 10.24 | VGCF | 32.1 | 40 | 3.1 | 42.34 | 15.89 | 9.85 | 34.30 | 36.70 | 63.20 |
| *4 | AB | 10.24 | VGCF | 26.75 | 40 | 2.6 | 36.99 | 15.98 | 9.89 | 34.40 | 36.50 | 64.00 |
| 3 | AB | 5.12 | AB | 10.24 | 40 | 2.0 | 15.36 | 16.10 | 13.17 | 18.20 | 20.20 | 75.00 |
| 4 | AB | 10.24 | AB | 15.36 | 40 | 1.5 | 25.6 | 16.54 | 10.92 | 18.40 | 20.30 | 74.50 |
| *5 | AB | 10.24 | AB | 10.24 | 40 | 1.0 | 20.48 | 14.14 | 12.23 | 52.30 | 20.40 | 70.20 |
| *6 | AB | 2.56 | AB | 10.24 | 40 | 4.0 | 12.8 | 20.94 | 14.01 | 35.60 | 20.30 | 65.60 |
| *7 | AB | 10.24 | AB | 5.12 | 40 | 0.5 | 15.36 | 16.10 | 14.02 | 67.80 | 21.20 | 64.20 |
| *8 | AB | 10.24 | AB | 2.56 | 40 | 0.3 | 12.8 | 19.85 | 15.32 | 78.90 | 21.30 | 60.40 |
| *9 | AB | 10.24 | AB | 25.6 | 40 | 2.5 | 35.84 | 16.14 | 9.95 | 35.30 | 31.20 | 56.40 |
| 5 | Graphene | 6.06 | AB | 10.24 | 40 | 1.7 | 16.3 | 16.26 | 13.88 | 18.30 | 20.90 | 75.12 |
| 6 | Graphene | 8.08 | AB | 10.24 | 40 | 1.3 | 18.32 | 15.58 | 11.98 | 17.98 | 20.20 | 74.32 |
| *10 | Graphene | 4.04 | AB | 10.24 | 40 | 2.5 | 14.28 | 21.06 | 15.76 | 34.30 | 31.30 | 63.40 |
| *11 | Graphene | 10.1 | AB | 10.24 | 40 | 1.0 | 20.34 | 12.91 | 12.20 | 52.50 | 20.60 | 70.40 |
| *12 | Graphene | 12.12 | AB | 10.24 | 40 | 0.8 | 22.36 | 12.52 | 11.79 | 54.30 | 32.00 | 64.30 |
| 7 | Graphene | 10.1 | VGCF | 21.4 | 40 | 2.1 | 31.5 | 16.67 | 10.07 | 18.70 | 21.00 | 75.45 |
| *13 | Graphene | 4.04 | VGCF | 21.4 | 40 | 5.3 | 25.44 | 18.54 | 11.00 | 37.80 | 43.20 | 53.00 |
| *14 | Graphene | 36.36 | VGCF | 85.6 | 40 | 2.4 | 121.96 | 17.60 | 9.67 | 36.70 | 44.50 | 52.00 |
| *15 | Graphene | 48.48 | VGCF | 85.6 | 40 | 1.8 | 134.08 | 17.08 | 9.54 | 38.90 | 47.60 | 51.90 |
| 8 | AB | 10.24 | VGCF | 21.4 | 10 | 2.1 | 31.64 | 16.00 | 10.03 | 18.30 | 20.01 | 75.23 |
| 9 | AB | 10.24 | VGCF | 21.4 | 50 | 2.1 | 31.64 | 15.54 | 12.34 | 17.50 | 21.34 | 75.32 |

TABLE 1-continued

| | Positive Electrode Composite Layer | | | | | | | Battery Performance | | | | |
|---|---|---|---|---|---|---|---|---|---|---|---|---|
| | First Composite Material First Postive Electrode Active Material (X1) $LiNi_{0.4}Co_{0.5}Mn_{0.1}O_2$ First Conductive Material | | Second Composite Material Second Postive Electrode Active Material (X2) $LiNi_{0.4}Co_{0.2}Mn_{0.4}O_2$ Second Conductive Material | | | | | Initial Stage | | After Cycle | | |
| Sample | Type | First Oil Absorption Number (Y1) [ml/100 g] | Type | Second Oil Absorption Number (Y2) [ml/100 g] | Mass Ratio of First Positive Electrode Active Material X1/(X1 + X2) [mass %] | Oil Absorption Number Ratio Y2/Y1 [—] | Oil Absorption Number Sum Y1 + Y2 [ml/100 g] | Low SOC IV Resistance SOC = 20% [mΩ] | Intermediate SOC IV Resistance SOC = 50% [mΩ] | Low SOC IV Resistance SOC = 20% [mΩ] | Intermediate SOC IV Resistance SOC = 50% [mΩ] | Capacity Maintenace Ratio [%] |
| *16 | AB | 10.24 | VGCF | 21.4 | 5 | 2.1 | 31.64 | 35.67 | 10.07 | 35.50 | 20.40 | 66.45 |
| *17 | AB | 10.24 | VGCF | 21.4 | 60 | 2.1 | 31.64 | 15.03 | 20.45 | 18.32 | 56.76 | 67.45 |

<Evaluation>

In a manner described below, each of the batteries of the samples was evaluated. In the description below, "C" is used as a unit of current rate. "1C" is defined as a current rate at which the SOC reaches 100% from 0% by charging for one hour.

<<Measurement of IV Resistance at Low SOC>>

The SOC of the battery was adjusted to 20%. In an environment of 25° C., the battery was discharged for 10 seconds at a current rate of 3 C. An amount of voltage drop during discharging was measured. By dividing the amount of voltage drop by discharge current, IV resistance was calculated. Results are shown in the column "Initial Stage/Low SOC/IV Resistance" in Table 1. It is indicated that as the IV resistance is lower, the output at the low SOC is higher.

<<Measurement of IV Resistance at Intermediate SOC>>

The SOC of the battery was adjusted to 50%. In an environment of 25° C., the battery was discharged for 10 seconds at a current rate of 3 C. An amount of voltage drop during discharging was measured. By dividing the amount of voltage drop by discharge current, IV resistance was calculated. Results are shown in the column "Initial Stage/Intermediate SOC/IV Resistance" in Table 1. It is indicated that as the IV resistance is lower, the output at the intermediate SOC is higher. A smaller difference is better between the IV resistance at the low SOC and the IV resistance at the intermediate SOC.

<<Cycle Durability Test>>

The initial capacity of the battery was measured. The battery was disposed in a thermostatic chamber set at 60° C. Charging/discharging was repeated 500 times at a current rate of 2 C and in a voltage range of 3.0 to 4.1 V. After the charging/discharging was performed 500 times, a post-cycle capacity was measured. By dividing the post-cycle capacity by the initial capacity, a capacity maintenance ratio was calculated. Results are shown in the column "Capacity Maintenance Ratio" in Table 1. It is indicated that as the capacity maintenance ratio is higher, the cycle durability is more excellent.

In the same procedure as those in "Measurement of IV Resistance at Low SOC", and "Measurement of IV Resistance at Intermediate SOC", the IV resistance at the low SOC and the IV resistance at the intermediate SOC after the cycle were measured. Results are shown in the column "After Cycle/Low SOC/IV Resistance" and the column "After Cycle/Intermediate SOC/IV Resistance" in Table 1. It is indicated that as a difference between the initial IV resistance and the IV resistance after the cycle is smaller, the cycle durability is more excellent.

<Results>

As shown in Table 1, the IV resistances at the low SOC and intermediate SOC are lower (i.e., output is higher) and the cycle durability is more excellent in the Examples satisfying the following conditions as compared with the Comparative Examples not satisfying the conditions: the mass ratio of the first positive electrode active material is 10 mass % or more and 50 mass % or less; the oil absorption number ratio is 1.3 or more and 2.1 or less; and the oil absorption number sum is 31.64 ml/100 g or less. This is presumably because a relatively small amount of the non-aqueous electrolyte solution exists around the first positive electrode active material and a relatively large amount of the non-aqueous electrolyte solutions exists around the second positive electrode active material.

In each of the Examples, the oil absorption number sum is 15.36 ml/100 g or more. Therefore, the oil absorption number sum may be 15.36 ml/100 g or more.

$LiNi_{0.4}Co_{0.5}Mn_{0.1}O_2$ used as the first positive electrode active material in each of the Examples is one of the compounds represented by the above-mentioned formula (I). $LiNi_{0.4}Co_{0.2}Mn_{0.4}O_2$ used as the second positive electrode active material in each of the Examples is one of the compounds represented by the above-mentioned formula (II).

Although the embodiments have been described, the embodiments disclosed herein are illustrative and non-restrictive in any respect. The technical scope indicated by the claims is intended to include any modifications within the scope and meaning equivalent to the terms of the claims.

What is claimed is:

1. A method of manufacturing a non-aqueous electrolyte solution secondary battery, the method comprising:

preparing a first composite material by mixing a first positive electrode active material, a first conductive material and a first binder;

preparing a second composite material by mixing a second positive electrode active material, a second conductive material and a second binder;

manufacturing a positive electrode by forming a positive electrode composite layer including the first composite material and the second composite material; and manufacturing the non-aqueous electrolyte solution secondary battery including the positive electrode, a negative electrode, and a non-aqueous electrolyte solution, the positive electrode composite layer being formed such that the first positive electrode active material has an average discharge potential lower than an average discharge potential of the second positive electrode active material, the first positive electrode active material has a mass ratio of 10 mass % or more and 50 mass % or less with respect to a total of the first positive electrode active material and the second positive electrode active material, the first conductive material has a first oil absorption number with respect to 100 parts by mass of the first positive electrode active material, the second conductive material has a second oil absorption number with respect to 100 parts by mass of the second positive electrode active material, a ratio of the second oil absorption number to the first oil absorption number is 1.3 or more and 2.1 or less, and a sum of the first oil absorption number and the second oil absorption number is 31.64 ml/100 g or less, wherein the first positive electrode active material has a first composition represented by $LiNi_{a1}Co_{b1}Mn_{c1}O_2$ (formula (I)) where $0.3<a1<0.5$, $0.4<b1<0.6$, $0<c1<0.2$, and $a1+b1+c1=1$, and the second positive electrode active material has a second composition represented by $LiNi_{a2}Co_{b2}Mn_{c2}O_2$ (formula (II)) where $0.3<a2<0.5$, $0.1<b2<0.3$, $0.3<c2<0.5$, and $a2+b2+c2=1$.

2. The method of manufacturing the non-aqueous electrolyte solution secondary battery according to claim 1, wherein the positive electrode composite layer is formed such that the sum of the first oil absorption number and the second oil absorption number is 15.36 ml/100 g or more.

3. A non-aqueous electrolyte solution secondary battery comprising:

a positive electrode;

a negative electrode; and a non-aqueous electrolyte solution, the positive electrode including a positive electrode composite layer, the positive electrode composite layer including a first composite material and a second composite material, the first composite material containing a first positive electrode active material, a first conductive material, and a first binder, the second composite material containing a second positive electrode active material, a second conductive material, and a second binder, the first positive electrode active material having an average discharge potential lower than an average discharge potential of the second positive electrode active material, the first positive electrode active material having a mass ratio of 10 mass % or more and 50 mass % or less with respect to a total of the first positive electrode active material and the second positive electrode active material, the first conductive material having a first oil absorption number with respect to 100 parts by mass of the first positive electrode active material, the second conductive material having a second oil absorption number with respect to 100 parts by mass of the second positive electrode active material, a ratio of the second oil absorption number to the first oil absorption number being 1.3 or more and 2.1 or less, and a sum of the first oil absorption number and the second oil absorption number being 31.64 ml/100 g or less;

wherein the first positive electrode active material has a first composition represented by LiNia1Cob1Mnc1O2 (formula (I)) where $0.3<a1<0.5$, $0.4<b1<0.6$, $0<c1<0.2$, and $a1+b1+c1=1$, and the second positive electrode active material has a second composition represented by LiNia2Cob2Mnc2O2 (formula (II)) where $0.3<a2<0.5$, $0.1<b2<0.3$, $0.3<c2<0.5$, and $a2+b2+c2=1$.

4. The non-aqueous electrolyte solution secondary battery according to claim 3, wherein the sum of the first oil absorption number and the second oil absorption number is 15.36 ml/100 g or more.

* * * * *